United States Patent [19]
Cole

[11] Patent Number: 5,850,217
[45] Date of Patent: Dec. 15, 1998

[54] ELECTRONIC FUNDS TRANSFER AUTHORIZATION SYSTEM FOR GENERATING A GRAPHICAL RECEIPT

[76] Inventor: Steven D. Cole, 10429 Fall Creek Rd., Indianapolis, Ind. 46256

[21] Appl. No.: 780,876

[22] Filed: Jan. 9, 1997

Related U.S. Application Data

[63] Continuation of Ser. No. 389,246, Feb. 16, 1995, abandoned.

[51] Int. Cl.[6] .................................................. G06F 15/00
[52] U.S. Cl. .......................... 345/326; 345/962; 705/16; 705/21; 705/24; 705/43
[58] Field of Search ..................................... 345/326, 962; 235/380, 381, 383; 705/16, 17, 18, 19, 20, 21, 22, 23, 24, 43, 44; 395/285

[56] References Cited

U.S. PATENT DOCUMENTS 5,500,514  3/1996  Veeneman et al. ...................... 235/381
5,557,752  9/1996  Remion .................................... 395/285

Primary Examiner—Ba Huynh
Attorney, Agent, or Firm—Woodard, Emhardt, Naughton Moriarty & McNett

[57] ABSTRACT

A graphical interface for a credit card authorization terminal. In a first embodiment of the present invention, the data transmission between the credit card authorization terminal and the receipt printer is monitored for the occurrence of a search data string containing the name of the retail establishment. Once located, the search data string is edited from the data transmission and a replacement data string is inserted. The replacement data string contains control and/or data words which cause the graphical logo of the retail establishment to be printed on the credit card receipt. In a second embodiment, the credit card authorization terminal is programmed to transmit the graphical command and/or data words directly to the receipt printer.

8 Claims, 11 Drawing Sheets

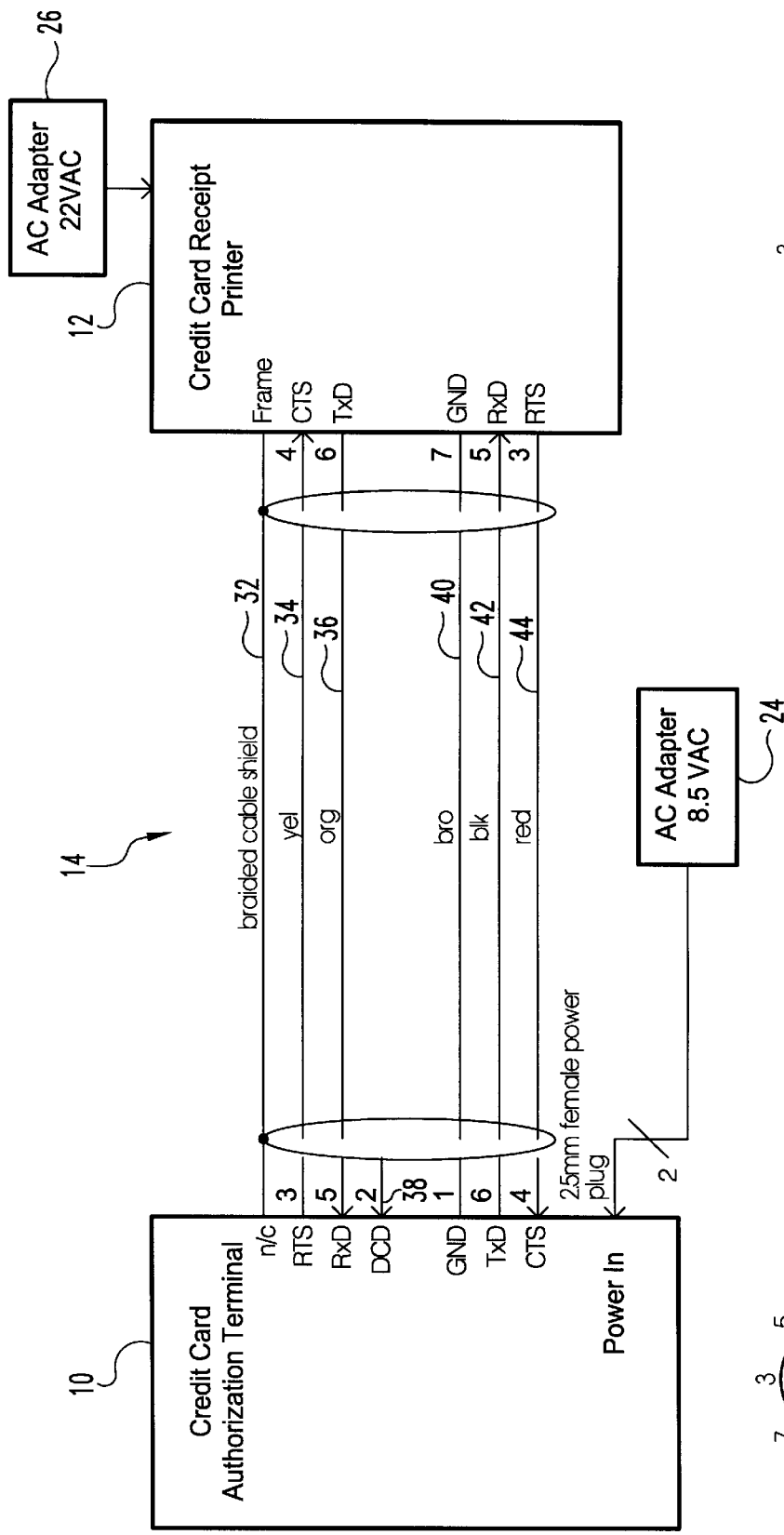
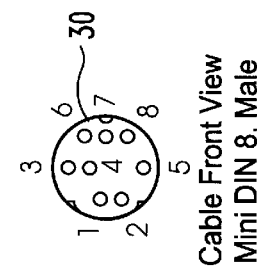
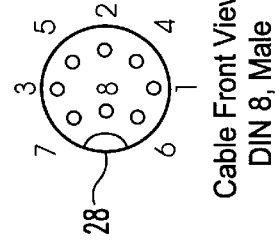
Fig. 2a *(Prior Art)*
Fig. 2b *(Prior Art)*
Fig. 2c *(Prior Art)*

```
01/08/95                    TIME: 12:30 PM

CAPTIN HOOK'S YACHT SUPPLY CO., INC

S A L E S   D R A F T

CARD ACCOUNT: 541972560439393
CARD TYPE: MC          EXP DATE: 05/95
AUTH NO: 022051        REF NO: 048-002

S A L E       $825.78

SIGNATURE

X_____
TOP COPY-MERCHANT   BOTTOM COPY CUSTOMER
```

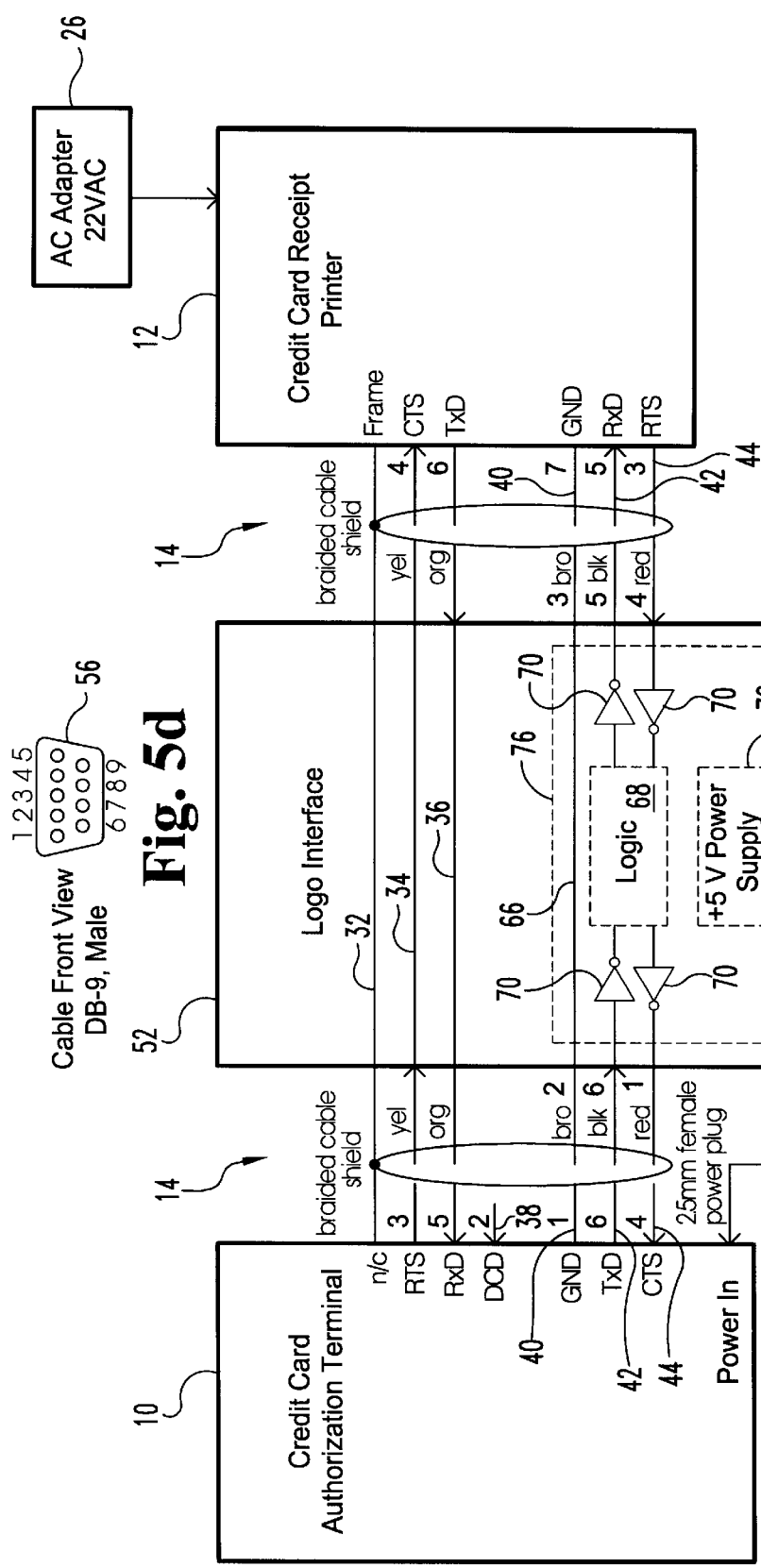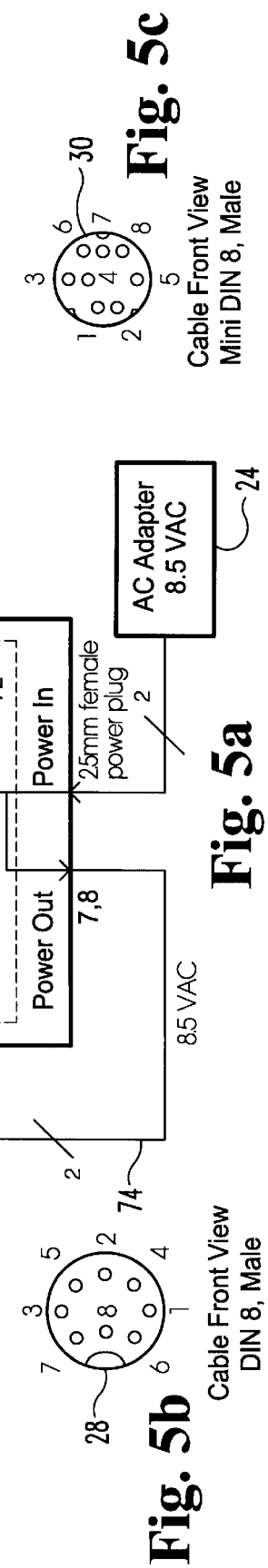

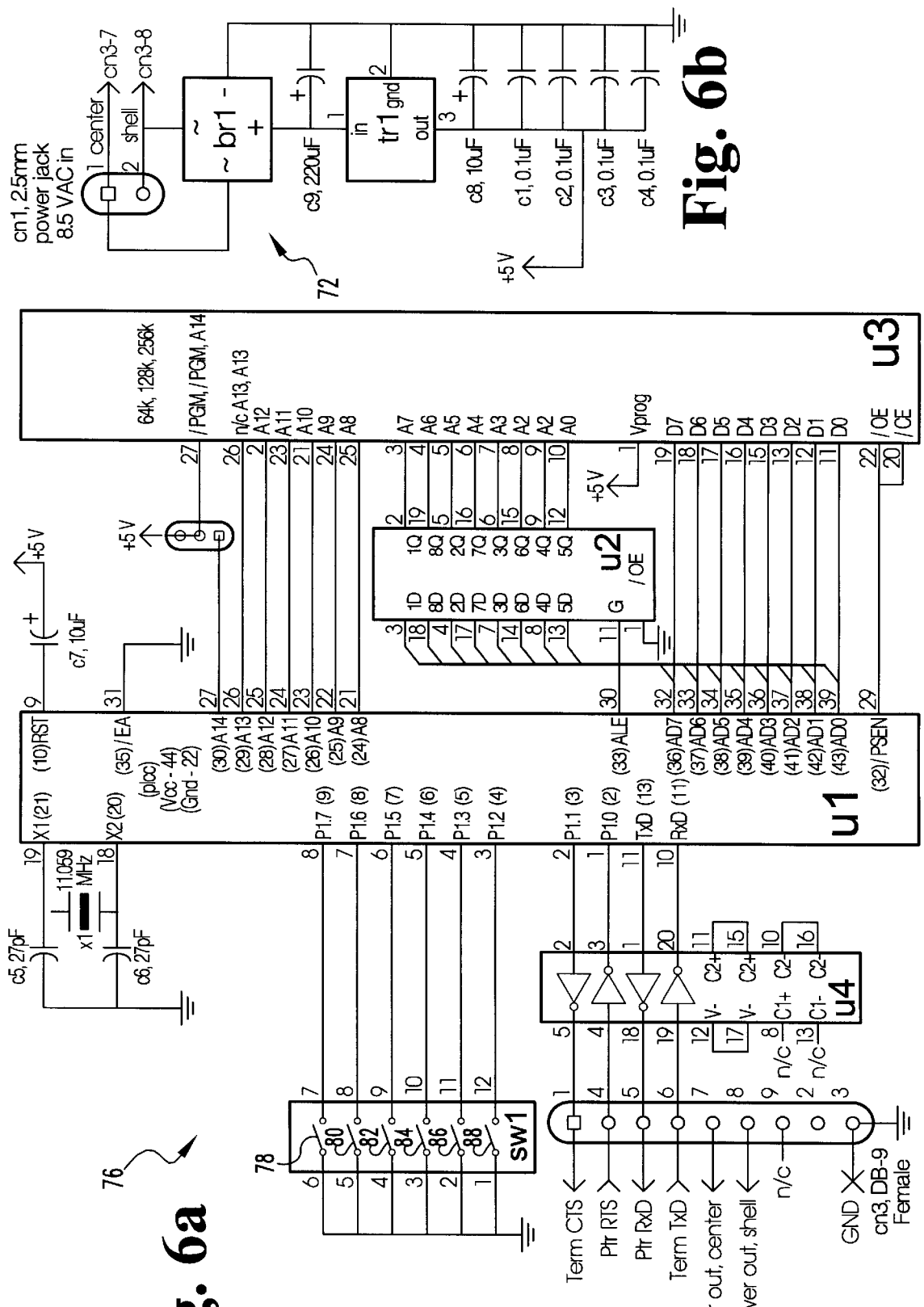

Fig. 7

```
Logo Box
{c} 1994, Micro Technology Co.

Diagnostic mode is running.

SW1 SW2 SW3 SW4 SW5 SW6
OFF OFF OFF ON  OFF OFF

Your Name: _____

Call back phone number: _____

Please FAX this form to our customer
service department at (317) 555-1212.

Firmware Version:
1.0

Search String:
4341535449420494F4F275330594143465420
5353535A4C5920494F2E2320494E425E Main Logo:
```

Captin Hook's Yacht
Supply Co., Inc.
Chesapeake Bay
Norfolk, Virginia

```
The logo system will now print a 'dump'
of the data coming from the terminal, if
you process a sale for $1.00. When
the printer stops printing, turn the
power off and re-connect the original
cable.

Print Image:
0312F30382F395202020202020202020
02020202020544940453A2031323A333020

0312F30382F395202020202020202020
02020202020544940453A2031323A333020
```

90

ELECTRONIC FUNDS TRANSFER AUTHORIZATION SYSTEM FOR GENERATING A GRAPHICAL RECEIPT

This is a continuation of application Ser. No. 08/389,246, filed Feb. 16, 1995, abandoned.

TECHNICAL FIELD OF THE INVENTION

The present invention relates generally to credit card authorization terminals, and more particularly to a graphical interface for credit card authorization terminals.

BACKGROUND OF THE INVENTION

Payment for goods and services by credit card has become ubiquitous at most retail and entertainment establishments throughout the world. Most consumers find credit cards convenient because they obviate the need to carry large sums of cash and also because they allow the consumer to extend payment over a period of time. Similarly, most retail and entertainment establishments encourage the use of credit cards because they enable consumers to purchase more goods and services than their available cash might otherwise allow, they obviate the need for store employees to handle large sums of cash, and they reduce the overhead costs associated with collecting on returned checks.

In order to complete a credit transaction, it is typically necessary that the merchant record the account number of the consumer's credit account and to obtain preauthorization from the credit granting authority in order to complete the sale. Referring to FIG. 1, there is illustrated a credit card authorization terminal 10 and an attached credit transaction receipt printer 12, such as those manufactured by VeriFone of Redwood City, Calif. The authorization terminal 10 is coupled to the receipt printer 12 by means of a multiconductor wire 14. Most credit cards contain the consumer's account number and other information encoded on a magnetic strip which runs across the back of the card (not shown). In order to initiate a credit transaction, the merchant slides the side of the credit card containing the magnetic strip through a slot 16 which has means for reading the information on the magnetic strip. Alternatively, the consumer's credit information may be taken by an embossed card reader, by manual input of the data using the keypad 18 integral with the authorization terminal 10, or by any other convenient means. The credit card authorization terminal 10 makes connection with a centralized credit granting authority via the attached telephone line 20. The merchant enters the total dollar amount of the sale into the authorization terminal 10 via the keypad 18. All of this information is transmitted to the credit granting authority via the telephone line 20, and the credit granting authority determines whether or not the transaction can be completed.

The credit granting authority will therefore return a credit authorization or a credit denial through the authorization terminal 10 via the telephone line 20. The authorization terminal 10 includes an integral display 22 which is used not only to verify the information input to the keypad 18, but also to display the credit approval or denial received from the credit granting authority. If approval for the transaction is received, the authorization terminal 10 then initiates the printing of a credit card receipt on the receipt printer 12 by sending appropriate control and data signals over the wire 14. The printer 12 prints a one-, two- or three-piece duplicate receipt which includes such information as the merchant's name, the consumer's credit card account number, the authorization code received from the credit granting authority, a description of the goods or services purchased, the total sale price of the goods or services, and a blank space for the consumer's signature. The consumer then signs the receipt in the space provided, one or two copies are retained by the merchant, and the other copy is retained by the consumer.

Referring now to FIGS. 2a–c, there is shown a schematic block diagram illustrating the interconnections between the credit card authorization terminal 10 and the credit card receipt printer 12. The credit card authorization terminal 10 is powered by an AC adapter 24 which converts a standard 110 volt alternating current (VAC) power line signal to an 8.5 VAC signal which powers the circuitry of the authorization terminal 10. Similarly, an AC adapter 26 is provided to transform the 110 VAC line signal to a 22 VAC signal which is used to power the receipt printer 12. The multiconductor cable 14 is terminated on one end by an 8 pin DIN 8 male connector 28 which couples to a complementary female connector (not shown) provided in the authorization terminal 10. The cable 14 is terminated on its other end by an 8 pin mini DIN 8 male connector 30, which couples to a complementary female connector (not shown) in the receipt printer 12. The exterior of the cable 14 is formed by a PVC jacket around a braided cable shield 32 which substantially completely encompasses the other conductors of the cable 14. The braided cable shield 32 is coupled to the metallic frame of the receipt printer 12. The interior of cable 14 comprises the wires 34–36 and 40–44.

The two lines 34 and 36 are used to transmit data from the receipt printer 12 to the authorization terminal 10. The line 34 is coupled to the request-to-send (RTS) output port of the authorization terminal 10 and to the clear-to-send (CTS) input port of the receipt printer 12. When the authorization terminal 10 desires information from the receipt printer 12, such as information indicating what style of printer is coupled to the line 14, the authorization terminal 10 activates its RTS port. When the CTS port of the receipt printer 12 sees an active signal on the line 34, it transmits the requested information over the line 36, which is coupled to the transmit data (TxD) output port of the receipt printer 12, and to the receive data (RxD) input port of the authorization terminal 10. In this way, the authorization terminal 10 is able to control data flow using the line 34, and the actual data transmission occurs on the line 36.

Transmission of data from the authorization terminal 10 to the receipt printer 12 is accomplished using lines 42 and 44. When the receipt printer 12 is able to receive data from the authorization terminal 10, it activates its request-to-send (RTS) output port coupled to line 44, which is coupled to a clear-to-send (CTS) input port on the authorization terminal 10. Upon activation of line 44, data is transmitted from the authorization terminal 10 to the receipt printer 12 via the line 42, which couples the transmit data (TxD) output port of the authorization terminal 10 to the receive data (RxD) input port of the receipt printer 12. In this way, the printer can control data flow using line 44.

The conductor 14 further includes a wire 40 which is used to couple the electrical ground of the authorization terminal 10 to the electrical ground of the receipt printer 12. The connector on the authorization terminal 10 includes a port 38 labeled data carrier detect (DCD) which is not used in the embodiment of FIG. 2.

Referring now to FIG. 3, there is illustrated a typical receipt 46 produced by the receipt printer 12. The receipt 46 is printed on a roll of duplicate receipt paper which is held by the receipt printer 12. After completion of the receipt 46, the merchant tears the duplicate receipt 46 from the receipt printer 12 and obtains the customer's signature thereon. The receipt 46 includes typical sale data such as the date and time of the sale, the name of the merchant's establishment, credit information including the card account number, card type and expiration date, information received from the credit granting authority, such as authorization number and reference number, information relating to the goods sold, the total purchase price and a blank space for obtaining the customer's signature thereon. In a restaurant application, a space may be provided to fill in a gratuity amount. Alternatively, the receipt 46 may be printed on pre-cut slips of paper rather than on a continuous roll of paper, as is known in the art.

The prior art receipt 46 fulfills its intended purpose of creating a memorial of the credit transaction, which includes all of the required pertinent information, as well as capturing a signature of the customer. However, the receipt 46 is completely nondescript, each such receipt looking nearly identical to every other such receipt. Even though the name of the merchant's establishment is printed on the receipt, it is printed exactly the same as all of the other data on the receipt and therefore tends to blend therewith. Furthermore, if the merchant uses a logo as part of his trademark, there is no way to imprint the logo onto the sales receipt 46. Consequently, the sales receipt 46, which is often the only piece of paper which the customer carries away from the merchant's establishment, is fairly ineffective as an advertising vehicle. It will be necessary for the customer to look closely at the receipt in order to determine at which retail establishment it was obtained.

There is therefore a need in the prior art for a means of printing a credit card receipt which will allow the merchant to more effectively advertise his retail establishment thereon. There is also a need for a means to allow the logo of a retail establishment to appear on the credit card receipt. The present invention is directed toward meeting these needs.

SUMMARY OF THE INVENTION

The present invention relates to a graphical interface for a credit card authorization terminal. In a first embodiment of the present invention, the data transmission between the credit card authorization terminal and the receipt printer is monitored for the occurrence of a search data string containing the name of the retail establishment. Once located, the search data string is edited from the data transmission and a replacement data string is inserted. The replacement data string contains control and/or data words which cause the graphical logo of the retail establishment to be printed on the credit card receipt. In a second embodiment, the credit card authorization terminal is programmed to transmit the graphical command and/or data words directly to the receipt printer.

In one form of the invention a graphical interface for a credit card authorization terminal is disclosed, comprising an input port adapted to receive a data transmission from the credit card authorization terminal; an interface circuit coupled to the input port for reception of the data transmission, wherein the interface circuit is operable to search the data transmission for a predetermined search data string and to modify the data transmission by inserting a predetermined replacement data string into the data transmission when the search data string is located; and an output port coupled to the interface circuit and to a credit transaction receipt printer, the output port adapted to receive the modified data transmission from the interface circuit and to relay the modified data transmission to the receipt printer.

In another form of the invention a method of providing a graphical interface for a credit card authorization terminal is disclosed, comprising the steps of: (a) receiving a data transmission from the credit card authorization terminal; (b) searching the data transmission for a predetermined search data string; (c) modifying the data transmission by inserting a predetermined replacement data string into the data transmission when the search data string is located; and (d) transmitting the modified data transmission to a credit transaction receipt printer.

In another form of the invention a method of recording a credit card transaction between a consumer and a merchant is disclosed, comprising the steps of: (a) determining an account number associated with the credit card; (b) determining a sale amount for the transaction; (c) transmitting the account number and sale amount to a remote credit granting authority; (d) receiving an approval for the credit card transaction from the remote credit granting authority; (e) retrieving data representative of a graphical trade logo of the merchant from a memory storage device; and (f) transmitting the account number, the sale amount and the data to a receipt printer, wherein the receipt printer prints a credit card transaction receipt including the graphical trade logo of the merchant.

In another form of the invention a credit card transaction authorization system is disclosed, comprising a credit card authorization terminal operable to obtain a credit card transaction approval from a remote credit granting authority; a first transmission line coupled to the credit card authorization terminal and operable to transmit a data transmission generated by the credit card authorization terminal; an interface circuit coupled to the first transmission line for reception of the data transmission, wherein the interface circuit is operable to search the data transmission for a predetermined search data string and to modify the data transmission by inserting a predetermined replacement data string into the data transmission when the search data string is located; a second transmission line coupled to the interface circuit and operable to transmit the modified data transmission; and a receipt printer coupled to the second transmission line for reception of the modified data transmission.

BRIEF DESCRIPTION OF THE DRAWINGS

FIGS. 2a–c is a schematic block diagram of the prior art credit card authorization terminal and receipt printer of FIG. 1.

FIG. 3 is a plan view of a prior art credit card transaction receipt produced by the system of FIG. 1.

FIGS. 5a–d are a schematic block diagram of a first embodiment apparatus of the present invention.

FIGS. 6a–b are an electrical schematic diagram of the first embodiment apparatus of the present invention.

FIG. 7 is a print out generated by the first embodiment apparatus of the present invention during diagnostic mode.

DESCRIPTION OF THE PREFERRED EMBODIMENT

Figure 1:
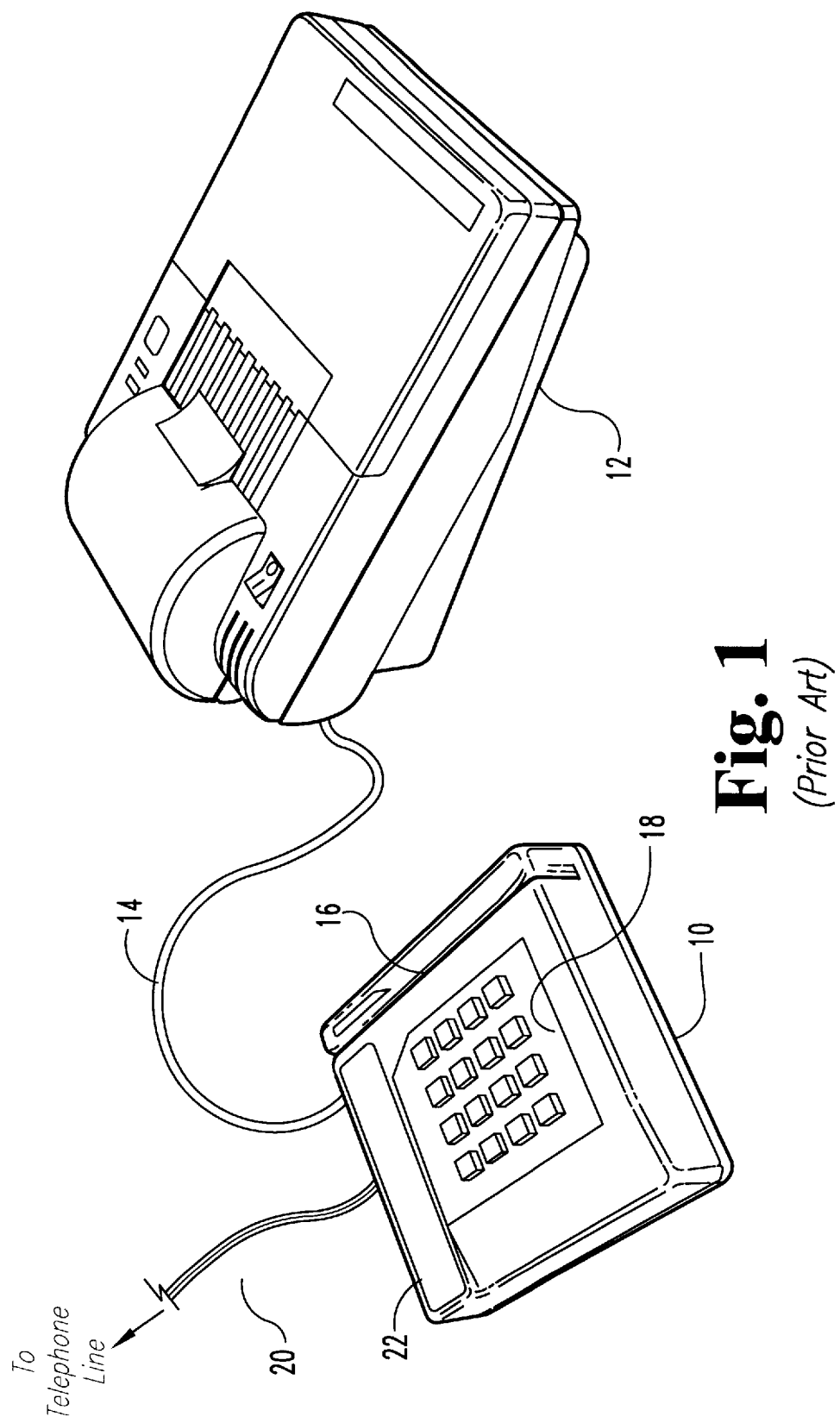
FIG. 1 is a perspective view of a prior art credit card authorization terminal and associated credit card receipt printer.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 4:
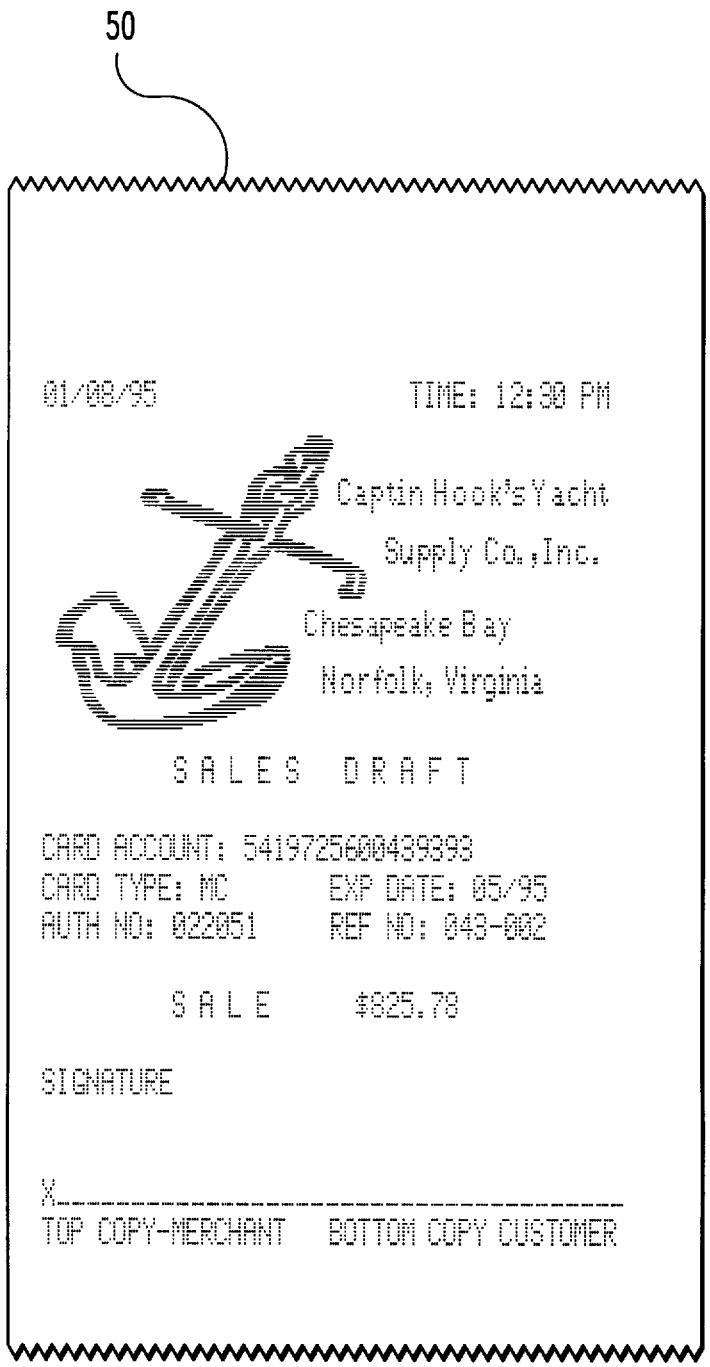
FIG. 4 is a plan view of a credit card transaction receipt produced by the present invention.

There is illustrated in FIG. 4 a first embodiment credit card transaction receipt 50 produced by the apparatus and method of the present invention. The receipt 50 of FIG. 4 corresponds to the prior art receipt 46 of FIG. 3, in that it records the identical credit account and sale information. However, it is readily apparent that the credit card transaction receipt 50 of the present invention is much more distinct and memorable than the prior art receipt 46, because the receipt 50 allows for inclusion of the merchant's trade logo, as well as a different, distinct type style for the lettering of the retail establishment's name and address.

As is readily apparent from a comparison of the prior art receipt 46 with the receipt 50 of the present invention, the inclusion of the merchant's logo on the receipt renders the receipt 50 a very effective advertising vehicle, because the customer will have immediate recognition of the retail establishment after only glancing at the logo. By comparison, a glance at the prior art credit transaction receipt 46 reveals only that it is a credit transaction receipt. A much closer inspection is required to distinguish the receipt 46 from other nearly identical nondescript receipts. The use of a logo in association with a retail establishment's trade name is a much more effective method of achieving consumer recognition than is a trade name alone. This is the reason why many retail establishments, particularly the largest and most successful of these establishments, spend a great deal of time and money in both developing and protecting their trade logo. The apparatus and method of the present invention allows such trade logos to be incorporated into the receipt of the credit card transaction, thereby turning each credit card transaction receipt 50 into a very effective advertising vehicle for the merchant.

Referring to FIGS. 5a–d there is illustrated a first embodiment apparatus of the present invention. The first embodiment apparatus of the present invention is designed to interface with an existing credit card authorization terminal 10 and credit card receipt printer 12 in a retrofit application. Such an implementation will allow the merchant to add the functionality of the present invention to his credit card authorization and receipt process without the need for discarding any of the equipment that he has already purchased. The interface 52 of the present invention plugs between the credit card authorization terminal 10 and the credit card receipt printer 12. All signal lines and communications carried thereon between the credit card authorization terminal 10 and the receipt printer 12 flow through the interface device 52. Some of the signals are simply passed through, while others are monitored and in certain situations altered.

The interface 52 is coupled between the credit card authorization terminal 10 and the receipt printer 12 via a connector 56 spliced into the cable 14. The connector 56 is preferably a 9 pin DB-9 male connector which mates with a complementary female connector integral with the interface 52.

As illustrated in FIGS. 5a–d the signals on lines 32–36 are not intercepted by the interface 52, and the connector 56 is preferably not coupled to these lines. The electrical ground line 40 is coupled to pins 2 and 3 of the connector 56 in order to provide a ground signal to the circuitry of interface 52. The interface 52 additionally provides an internal connection 66 which couples pins 2 and 3 of the connector 56.

The interface 52 includes logic circuitry 68 which monitors the communications between the RTS port of the receipt printer 12 and the CTS port of the authorization terminal 10, as well as communications between the TxD port of the authorization terminal 10 and the RxD port of the receipt printer 12. Buffers 70 are provided between these ports and the logic circuitry 68 in order to maintain the proper signal levels (such as RS-232, for example). The logic circuitry 68 is powered by a regulated +5V power supply 72 which is in turn powered by the 8.5 VAC adapter 24. The AC adapter 24 is coupled to the interface 52 instead of directly to the authorization terminal 10, as in the prior art. The required power is supplied to the authorization terminal 10 by means of a coupling 74 between the interface 52 and the authorization terminal 10.

In operation, the interface 52 is completely invisible to the authorization terminal 10 and the receipt printer 12. Both the authorization terminal 10 and the receipt printer 12 function exactly as they would without the interface 52 connected therebetween. Therefore, the authorization terminal 10 still transmits the same data to the receipt printer 12 as in prior art applications. However, the interface 52 of the present invention monitors these data transmissions and searches them for a preprogrammed search data string. The search data string corresponds to the data transmitted by the authorization terminal 10 to print the name of the retail establishment on the credit card transaction receipt, for example. When the logic circuitry 68 of the interface 52 identifies the predetermined search data string in the data transmission, it discards this string and replaces it with a predetermined replacement data string, which is transmitted to the receipt printer 12. From the point of view of the receipt printer 12, it is simply receiving data transmitted by the authorization terminal 10, and the substitution of data goes unnoticed by the receipt printer 12. The replacement data string that is substituted in the data transmission by the logic 68 contains graphical command information (control and/or data words) which causes the receipt printer 12 to print the logo of the retail establishment on the credit card transaction receipt 50. The replacement data string may also include information which will cause the receipt printer 12 to print the name and/or address of the retail establishment on the receipt 50, either using graphical commands or using ordinary text commands. Alternatively, the logic 68 might simply insert the graphical commands before or after the search data string in addition to allowing the search data string to be transmitted to the receipt printer 12. In this way, the data in the search data string from the authorization terminal 10 is still transferred to the receipt printer 12, however the logo interface 52 adds further graphical data which causes the retail establishment's graphical logo to be printed on the receipt 50 in addition to the name of the retail establishment which is normally printed.

It will be appreciated by those skilled in the art that the interface 52 can be programmed to search for any string of characters in the data transmission between the authorization terminal 10 and the receipt printer 12. When the search string is located, any preprogrammed data string can be sent from the interface 52 to the receipt printer 12 before, after, or in place of the search string. The replacement data string may therefore optionally include data to print a logo or data to print a logo and the name of the merchant's establishment.

Referring now to FIGS. 6a–b there is illustrated an electrical schematic diagram of the circuitry enclosed within the box 76 of FIG. 5a. The circuitry of FIGS. 6a–b includes a microcontroller u1 which implements the function of searching the data transmitted from the authorization terminal 10 to the receipt printer 12 for the predetermined search string and substituting therefore the predetermined replacement string of data. The microcontroller u1 is preferably a model 80C31 microcontroller manufactured by Intel Corporation of Santa Clara, Calif. The pin designations shown in the schematic of FIGS. 6a–b refer to the 80C31 microcontroller packaged in a dual in-line package (DIP). The pin designations in parentheses refer to the 80C31 microcontroller packaged in a plastic leaded chip carrier (PLCC). The PLCC version of u1 is preferred because of its much smaller footprint on the circuit board.

The microcontroller u1 includes 128 bytes of internal random access memory (RAM) which is used to store program variables. An executable program is stored in the memory u3 and in the preferred embodiment searches the data transmitted by the authorization terminal 10 for a predetermined search string, and replaces this predetermined search string with a replacement data string if the search string is identified. The replacement data string is stored in the memory device u3 coupled to the microcontroller u1. The memory u3 is preferably an erasable programmable read only memory (EPROM), such as a 27C64-12 64K memory manufactured by National Semiconductor of Santa Clara, Calif. The contents of the memory u3 are programmed to contain data representative of the logo and any textual information desired to be printed on the credit card transaction receipt 50 as part of the replacement data string. As will be appreciated by those skilled in the art, the size of the memory u3 may be decreased or increased, depending upon the total amount of data necessary to specify the desired logo and/or text and the size of the executable program.

The microcontroller u1 is coupled to the memory u3 via a plurality of address and data lines. The ports AD0–AD7 are multiplexed address and data lines. These lines are used both for inputting and outputting data and also for outputting the lower 8 bits of a memory address. The ports AD0–AD7 are coupled directly to the data ports D0–D7, respectively, of the memory u3. The ports AD0–AD7 are additionally coupled to the ports A0–A7 of the memory u3 through a latch u2. The latch u2 is preferably a model 74AC373 octal latch manufactured by Texas Instruments of Dallas, Tex. When the microcontroller u1 is placing address information at the output ports AD0–AD7, it raises its address latch enable (ALE) port to a logic high. The ALE port is coupled to a gate (G) port of the latch u2. Therefore, the latch u2 will only latch data from the microcontroller u1 to the low order address ports of the memory u3 when the ALE port is at a logic high. Conversely, when the microcontroller u1 is reading data at the ports AD0–AD7, the ALE port is maintained at a logic low, thereby preventing the data from being latched to the address ports of the memory u3. The data is instead transferred to the microprocessor data ports AD0–AD7 from the memory u3.

The microcontroller u1 further includes high order address ports A8–A14. The ports A8–A13 of the microcontroller u1 are coupled directly to the corresponding address ports A8–A13 of the memory u3. Depending upon the size of the memory u3, the two highest order bits of the address may not be required to uniquely specify an individual address location within the memory u3. For example, the address bit A13 is not necessary in a 64 k memory, however it is necessary in a 128 k or 256 k memory. In the 64 k version of the National Semiconductor 27C64-12, there is simply no connection made to the pin that normally receives the A13 address bit, therefore in the schematic of FIG. 6a, A13 of the microcontroller u1 is coupled directly to the A13 port of the memory u3. Additionally, the address bit A14 is not required in the 64 k or 128 k versions of this memory device, and the pin which normally accepts the A14 bit in the 256 k version of the memory device is used for a different purpose in the 64 k and 128 k versions. For this reason, there is a jumper cn2 located between the A14 port of the microcontroller u1 and the A14 port of the memory u3. A jumper wire is placed in a first position on the jumper cn2 in order to connect these two ports together if the 256 k version of the memory is being utilized, and the jumper wire is placed in a second position on the jumper cn2 if the 64 k or 128 k version of this memory is being used. The second position of the jumper wire on the jumper cn2 couples this port of the memory u3 to +5V. Such connection of the address lines between the microcontroller u1 and the memory u3, which depend upon the storage size of the memory u3, are considered to be well known to those of ordinary skill in the art.

The microcontroller u1 further contains a program store enable (PSEN) port which is coupled to the memory u3 at both the output enable (OE) and the chip enable (CE) inputs. Timing for the microcontroller u1 is provided by an external crystal X1, which is preferably an 11.059 MHz crystal, as is known in the art.

Connector cn3 is the female connector which mates with the connector 56 which is spliced into the cable 14. The inputs and outputs of the circuitry 76 are carried through the connector cn3 and are buffered by the buffers u4 which correspond to the buffers 70 of FIG. 5. Through the buffers u4, the RTS line of the receipt printer 12 is coupled to the I/O port P1.0 of microcontroller u1. Similarly the I/O port P1.1 of microcontroller u1 is coupled to the CTS port of authorization terminal 10. The receive data (RxD) input port of the microcontroller u1 is coupled to the TxD port of the authorization terminal 10, and the transmit data (TxD) output port of the microcontroller u1 is coupled to the RxD port of the receipt printer 12. By these four connections, the microcontroller u1 is able to intercept, monitor, and alter the data transmissions between the authorization terminal 10 and the receipt printer 12. The process by which the microcontroller u1 accomplishes this task is described with more particularly hereinbelow with reference to FIGS. 8a–c.

The circuitry 76 of FIG. 6a is powered by the 8.5 VAC input from the AC adapter 24 which is applied to connector cn1. This 8.5 VAC signal is applied directly to pins 7 and 8 of the connector cn3 in order to directly transfer power to the authorization terminal 10. The signal is further applied to a bridge rectifier br1 which converts the AC voltage to a DC voltage, as is known in the art. The capacitor C9 is coupled across the DC outputs of the bridge rectifier br1 in order to filter the DC output. The DC signal produced by the bridge rectifier is regulated by the 5V voltage regulator tr1. The voltage regulator tr1 is preferably a model 78M05, manufactured by National Semiconductor of Santa Clara, Calif. The regulated output of the voltage regulator tr1 is filtered by the capacitor C8 which is placed across its regulated outputs. The capacitors C1–C4 represent decoupling capacitors which are located between the +5V power supplies of each of the chips u1–u4 and ground, as is known in the art.

The circuitry 76 of FIG. 6a further includes a six-position dual in-line package (DIP) switch sw1 which is used to select or deselect optional features of the interface 52. The switches sw1 are coupled to the I/O ports P1.2–P1.7 of the microcontroller u1, as shown. Switch 78 may be used to select between two different predetermined models of the receipt printer 12. This is necessary if the logo interface 52 is designed for use with two such different printers, and if the printers require different input data or input commands in order to print the credit card transaction receipt 50. The position of the switch 80 determines whether or not a trailer image will be printed at the bottom of the credit card transaction receipt 50 below the signature block. By closing switch 80, an image may be printed at the bottom of every receipt. The switch 82 is used to set the interface 52 in diagnostic mode. The functioning of the diagnostic mode is described in greater detail hereinbelow with reference to FIG. 7. The switch 84 is used to select between the use of black ink or red ink when printing the logo on the credit card transaction receipt 50. In this way, the logo and/or name of the retail establishment may be made to stand out even further from the sales data by printing it in a different color. The switch 86 is used to include or exclude the merchant's name as received from the authorization terminal 10 in the data printed on the credit card transaction receipt 50. For example, if the switch is selected such that the name is excluded, when the search string containing the name is located, this string is discarded and the interface 52 prints only the information stored in the replacement string in its memory. However, if the switch 86 is positioned such that the name is to be included, the interface 52 prints the replacement string stored in its memory as well as the search string. In this way, the data stored in the memory of the interface 52 may contain only the graphical logo information, and the name of the retail establishment may be printed using the data generated by the authorization terminal 10. Finally, the switch 88 determines whether the name of the retail establishment will be printed before or after the graphical logo. Note that this selection is only effective if the switch 86 has been selected to include the name in the print out.

By setting the switches 78–88 to various positions, it is possible for the system programmer and/or the user to reconfigure the interface 52 to perform a variety of functions. The use of the switches 78–88 provide for a degree of flexibility in the logo interface 52 which would not be present without their inclusion. It is understood, however, that the inclusion of the switches 78–88 is optional, and all of the functions selected by the switches may be semi-permanently programmed into the operation of the microcontroller u1.

Referring now to FIG. 7, there is illustrated a diagnostic print-out 90 generated by the circuitry 76 when the switch 82 is positioned in diagnostic mode. The purpose of the diagnostic print-out 90 is to obtain system configuration information for troubleshooting purposes when the interface 52 is not operating property. In a preferred embodiment, the diagnostic print-out 90 includes a space to fill in the merchant's name and telephone number, as well as instructions to send a facsimile transmission of the diagnostic print-out 90 to the service department of the manufacturer of the interface 52. This feature of the diagnostic print-out 90 allows immediate troubleshooting of a malfunctioning interface 52 without the need for service personnel to visit the retail establishment. In order to facilitate such troubleshooting, the diagnostic print-out 90 includes several pieces of pertinent information about the interface 52 which the service personnel will examine in an attempt to determine why the interface 52 may be malfunctioning. For example, the position in which each of the switches 78–88 are set is indicated on the diagnostic print-out 90. The firmware version programmed into the microcontroller u1 is also indicated. Additionally, the entire search string is listed in hexadecimal code. Next, the replacement data string is used to create a facsimile of the merchant's logo on the diagnostic print-out 90. This portion of the diagnostic print-out 90 illustrates the graphics and/or text that are printed by the interface 52 on the credit card receipt 50. The diagnostic print-out 90 next instructs the merchant to enter a credit transaction in the amount of one dollar on the credit authorization terminal. As the credit authorization terminal processes this credit transaction, the interface 52 captures all of the data transmissions coming from the authorization terminal 10 and prints these transmissions onto the diagnostic print-out 90 as hexadecimal code.

With the above information, service personnel can troubleshoot many common problems with the system. For example, sometimes improper operation is due to the option switches 78–88 being set in positions which are inconsistent with the retailer's desired operation of the device. In other instances, the fault lies with the operation of the credit card authorization terminal 10, rather than with the interface 52. If this is the case, the hexadecimal data print-out of the data transmitted by the authorization terminal 10 will verify whether the authorization terminal 10 is transmitting the proper data. Finally, a comparison can be made between the search string which is printed on the diagnostic print-out 90 and the data being transmitted from the authorization terminal 10. This is necessary to verify that the data in the search string matches exactly the data transmitted by the authorization terminal 10 which is to be captured. For example, if the search string indicated the end of the search line as a carriage return followed by a line feed, but the authorization terminal 10 terminated its line by a line feed followed by a carriage return, the search string would not identify this sequence as a proper match and no replacement string would be printed. A comparison of the search string with the hexadecimal data dump from the authorization terminal 10 can pinpoint programming errors such as these. It will be appreciated by those skilled in the art that other pertinent data may be printed on the diagnostic print-out 90. Ideally, the service personnel will determine which data is required for effective troubleshooting of the system, and this data will be printed out on the diagnostic print-out 90.

Figure 8A:
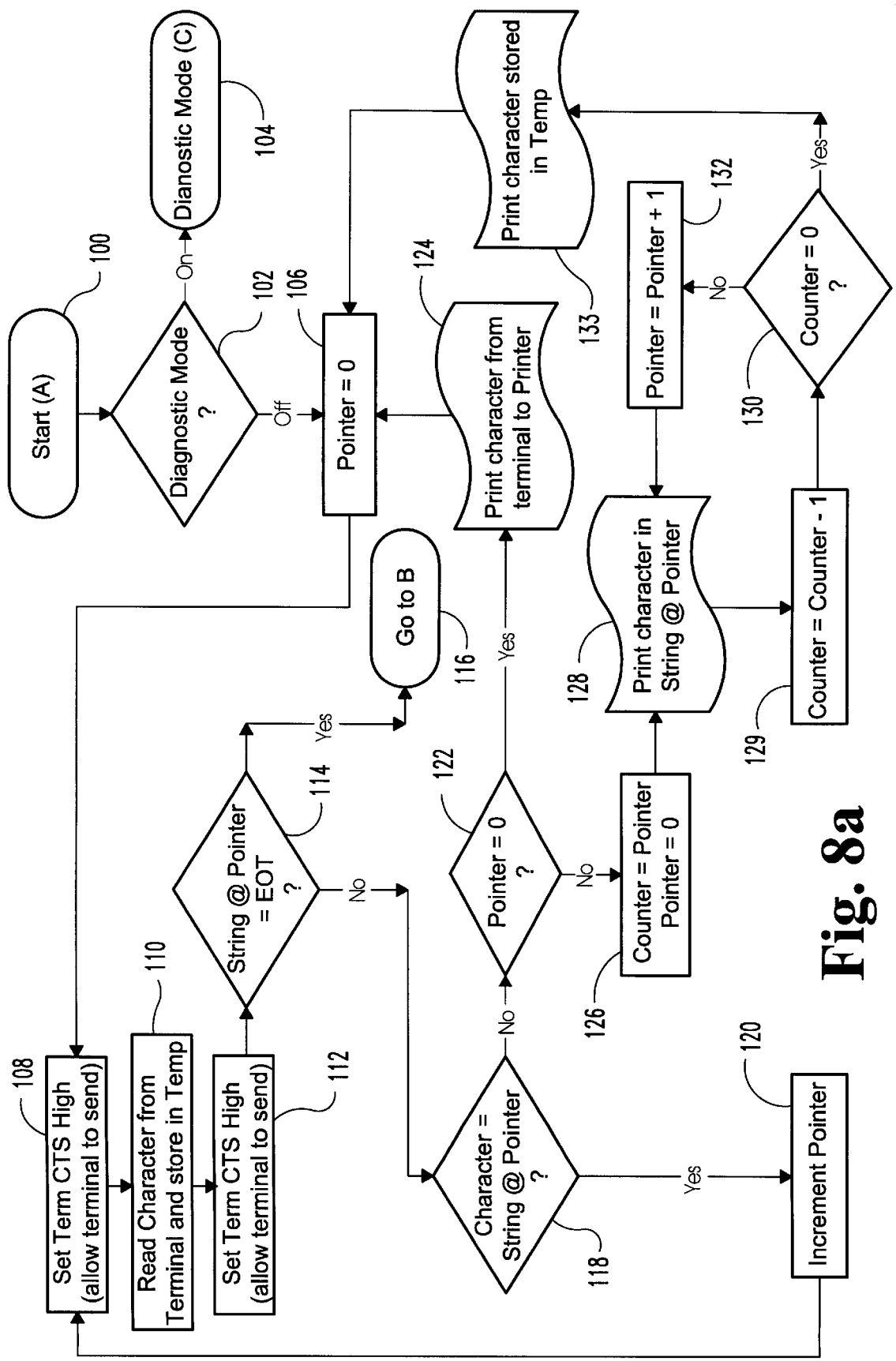
FIGS. 8a–c are a schematic flow chart of a first embodiment method of the present invention.
Figures 8B, 8C:
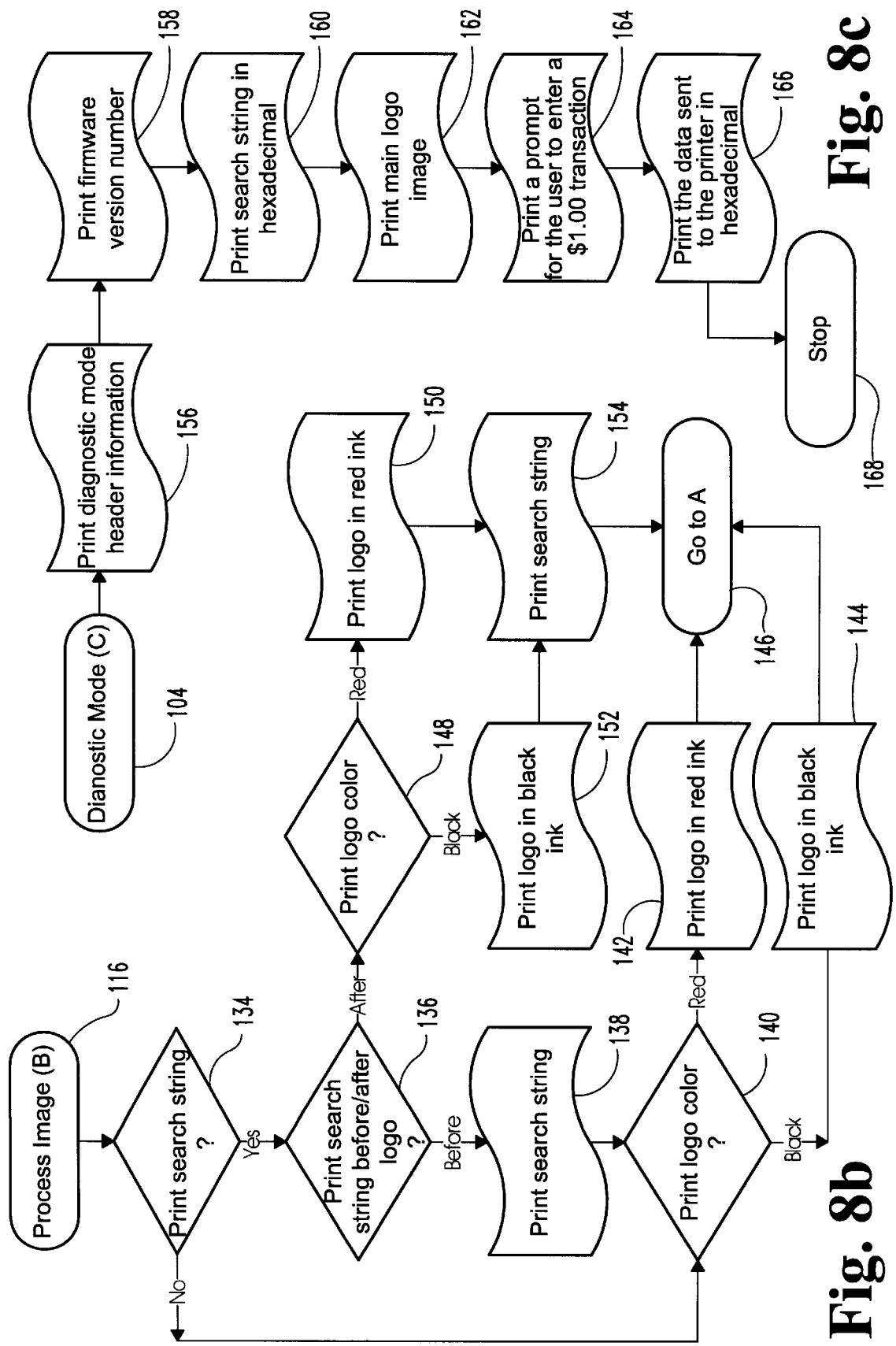

Referring now to FIGS. 8a–c there is illustrated a first embodiment method of the present invention. The method illustrated in the process flow diagrams of FIGS. 8a–c is programmed as the firmware program in the microcontroller u1. The process starts at step 100 and proceeds directly to step 102 which determines if the device has been placed into diagnostic mode by proper setting of the switch 82. If diagnostic mode has been selected by the user, the process goes to the diagnostic subroutine at step 104, as is described in greater detail hereinbelow. If, however, diagnostic mode has not been selected by the user at step 102, a pointer is set to 0 at step 106 and then a logical high signal is applied to the CTS port of the authorization terminal 10 at step 108. This is accomplished by lowering the I/O port P1.1 of microcontroller u1 to a logical low. Step 108 has the effect of causing the authorization terminal 10 to transmit data to the receipt printer 12, and this data is intercepted by the interface 52. Therefore, the process of FIG. 8 reads a character from the data transmitted by the authorization terminal 10 at step 110 and then places a logic low signal at the CTS port of the authorization terminal 10 at step 112 in order to stop the data transmission. It will be appreciated by those skilled in the art that the manipulation of the CTS port of the authorization terminal 10 by adjusting the level on I/O port P1.1 of microcontroller u1 allows the interface 52 to start and stop the data transmission from the authorization terminal 10.

Once the interface 52 has captured data from the authorization terminal 10, it will begin the process of searching this data for the predetermined search string. The pointer is used to keep track of how much of the predetermined search string has been matched with characters transmitted by the authorization terminal 10. Therefore, the process starts out with the pointer equal to 0 so that position 0 of the predetermined search string (i.e. the first character in the search string) can be compared to each character transmitted by the authorization terminal 10. Once a match is found, the pointer is incremented and the second character in the predetermined search string is compared to the next character transmitted by the authorization terminal 10. This process continues until all of the characters in the search string have been identified sequentially in the transmission from the authorization terminal 10. Therefore, the process determines at step 114 whether the character in the search string which is pointed to by the pointer is an end of text (EOT) character, indicating that the end of the search string has been reached. If the end of the search string has been reached, then this indicates that a match was found. In this case, the process of FIG. 8 will then print the logo stored in the replacement string at step 116, as described in greater detail hereinbelow. If, however, the character in the search string pointed to by the pointer is not the EOT character, then the process continues to step 118 to determine if the character captured in the data transmission from the authorization terminal 10 is equal to the next character in the search string. If there is a match at step 118, the pointer is incremented at step 120 so that it points to the next sequential character in the search string, and the process returns to step 108 in order to receive another character from the authorization terminal 10.

If, however, there was no match at step 118, this means that the search string has not been located in the data transmission from the authorization terminal 10. Step 122 then determines if the pointer is still equal to 0. If the pointer is still equal to 0, then only one character was received from the authorization terminal 10 before it was determined that there was no match with the search string. In this case, it is only necessary to send this received character to the receipt printer 12 at step 124 and then begin the matching process over at step 106.

If, however, step 122 indicates that the pointer has a non-zero value, it will be necessary to send to the receipt printer 12 all of the characters which were captured by the interface 52. Because each of the characters in the search string up to the character currently pointed to by the pointer were found to match the data transmission from the authorization terminal 10, these characters can be sent to the receipt printer 12 in order to make up for the data transmission that was intercepted by the interface 52. In order to facilitate this process, a counter is set equal to the current pointer value at step 126 and the pointer is reset to 0. Step 128 then prints the character in the search string which is pointed to by the pointer, which in this case is the character at position 0. The counter is next decremented at step 129. Step 130 then determines if the counter is equal to 0. If the counter is equal to 0, then all of the characters captured by the interface 52 have been transmitted to the receipt printer 12, except the last character received from the authorization terminal. This last character is printed at step 133 and the process continues at step 106 to continue trying to match the search string with the data transmissions from the authorization terminal 10. If, however, the counter does not equal 0 at step 130, the pointer is incremented at step 132. The process then returns to step 128 in order to print the character in the search string which is pointed to by the current pointer. This loop is executed until all of the characters captured by the interface 52 have been retransmitted to the receipt printer 12.

It will be appreciated by those skilled in the art that the method illustrated in FIG. 8A is effective in searching the data transmission between the authorization terminal 10 and the receipt printer 12 for a character string that matches a predetermined search string. If a partial match is found, but the transmission is then determined not to match the entire search string, the process of FIG. 8A will retransmit the captured information to the receipt printer 12 such that no data is lost. If, however, a match is found between the data transmitted by the authorization terminal 10 and the predetermined search string, the process will enter the image processing subroutine 116 of FIG. 8b.

Referring now to FIG. 8B, there is illustrated a preferred embodiment of the image processing subroutine 116 of the present invention. The process begins at step 134, which determines whether the search string is to be printed in addition to the replacement string. This is determined by examining the setting of switch 86. If the search string is to be printed in addition to the replacement string, step 136 determines whether the search string or the replacement string is to be printed first. This is determined by examining the position of switch 88. If step 136 determines that the search string is to be printed before the replacement string, the search string is then printed at step 138. This is accomplished by outputting the search string through the TxD port of the microcontroller u1 to the RxD port of the receipt printer 12. Step 140 then determines if the logo in the replacement string is to be printed in a different color than the rest of the credit card receipt 50. This is determined by examining the position of switch 84. In the preferred embodiment, the two position switch 84 selects between printing the replacement string in red and black. If switch 84 indicates that the logo is to be printed in red, then step 142 sends a command to the receipt printer 12 to print in red ink and this is followed by a data transmission of the replacement string. Similarly, if the switch 84 indicates that the logo is to be printed in black, step 144 sends a command to the receipt printer 12 to print in black ink, followed by a data transmission of the replacement string. The image processing routine is discontinued after either steps 142 or 144, and the process is returned to the starting step 100 at step 146.

If step 136 indicates that the search string is to be printed after the logo, then the process continues at step 148 which determines if the logo is to be printed in color by examining the position of switch 84. If the logo is to be printed in red, this is done at step 150, and if the logo is to be printed in black, this is done at step 152. After the completion of either of the steps 150 or 152, the search string is then printed at step 154. After this, the process returns to beginning step 100 at step 146. It will be appreciated by those skilled in the art that the image processing routine 116 enables several positioning and coloration options to be implemented in the printing of the search string and/or the replacement string by various settings of the option switches in the circuitry 76.

Also illustrated in FIG. 8c is the routine 104 for printing the diagnostic print-out 90. This routine is entered if step 102 determines that the diagnostic mode was selected by a proper positioning of the switch 82. The diagnostic mode routine 104 begins at step 156 which prints header information on the diagnostic print-out 90, including a notice that the diagnostic mode is currently running, the current settings of the switches 78–88, a blank space for the merchant to fill in his name and telephone number, as well as instructions to send a facsimile transmission of the completed diagnostic print-out 90 to the customer service department of the manufacturer of the interface 52. Step 158 then prints the firmware version number which is currently being executed by the microcontroller u1. The preprogrammed search string is then printed in hexadecimal code at step 160, and the logo image contained in the replacement string is printed at step 162. Step 164 prompts the merchant to enter a one dollar sale transaction, which causes the authorization terminal to initiate a data transmission to the receipt printer 12. This data transmission is captured by the interface 52 at step 166 and printed on the receipt printer 12 as hexadecimal code. As described hereinabove with reference to FIG. 7, the data printed by the diagnostic mode routine 104 will facilitate troubleshooting of the interface 52 by service personnel at the manufacturer's service department. The diagnostic mode routine 104 ends at step 168.

In a second embodiment of the present invention, a credit card authorization terminal may be designed to cause the merchant's logo to be printed on the receipt printer without the need for an interface therebetween. Such an embodiment would be a non-retrofit application. Prior art credit card authorization terminals 10 are based upon microcontrollers which implement the standard functions performed by the authorization terminal, such as reading the credit card data off of the magnetic strip on the credit card, communicating with the remote credit granting authority, and transmitting data to the receipt printer 12. In the second embodiment of the present invention, the firmware residing in the microcontroller of the credit card authorization terminal is designed to provide the step of printing the merchant's graphical logo information on to the credit card receipt. Therefore, instead of providing a separate interface to intercept the data transmissions between the credit card authorization terminal and the receipt printer, the credit card authorization terminal simply transmits the desired graphical command and/or data information to the printer in order to print the graphical logo directly.

Figure 9:
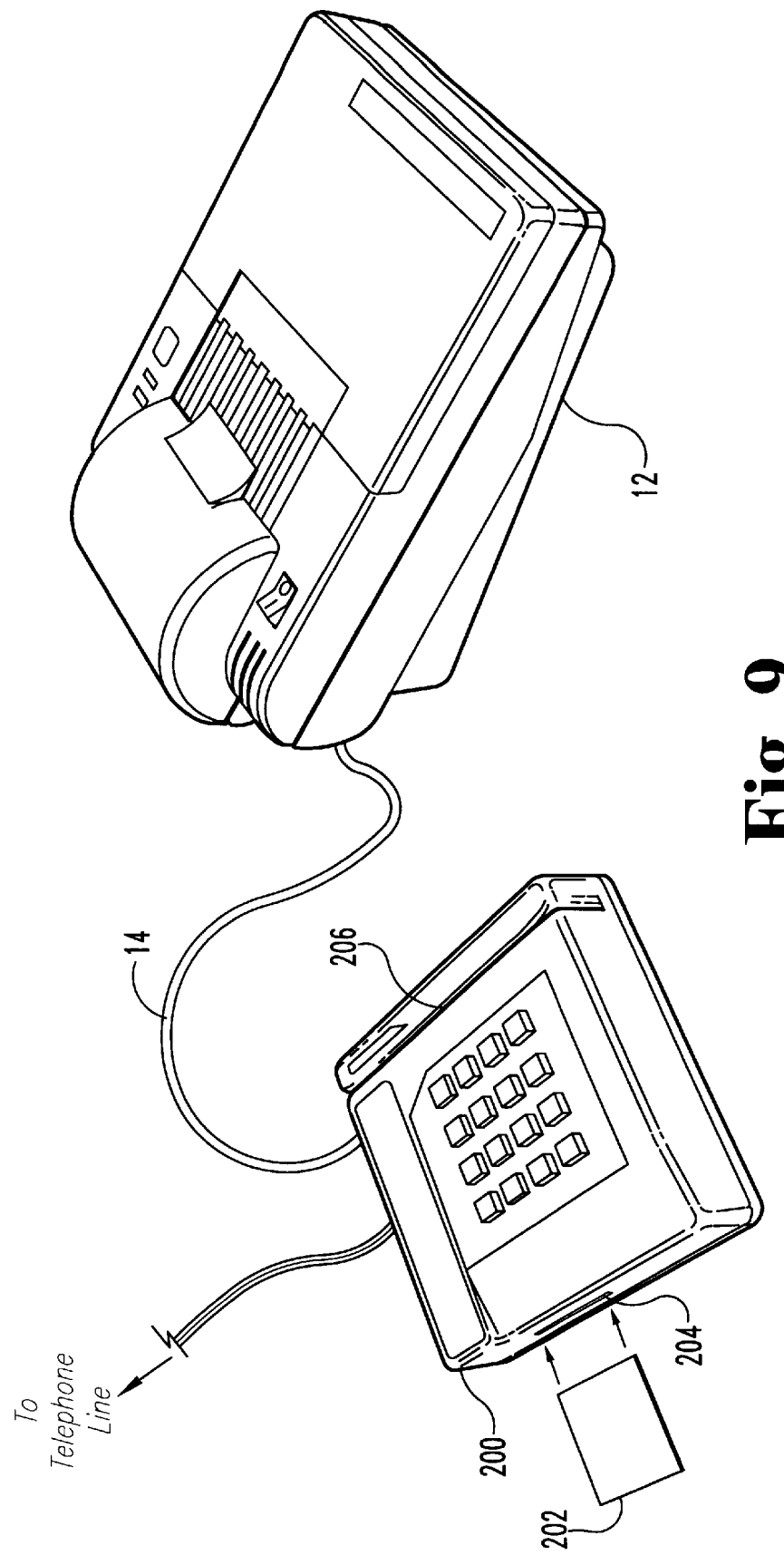
FIG. 9 is a perspective view of a second embodiment apparatus of the present invention.

A second embodiment apparatus of the present invention is illustrated in FIG. 9. The credit card authorization terminal 200 of the second preferred embodiment is coupled to a receipt printer 12 by a multiconductor wire 14. The authorization terminal 200 includes a microcontroller which is programmed to send graphical commands and/or data to the receipt printer 12 in order to print a merchant logo on the credit transaction receipt 50. It is preferable, but not necessary, that the graphical information be stored in a memory device located on a PCMCIA (Personal Computer Memory Card International Association) style card 202 which may be preprogrammed with the graphical information by the manufacturer and inserted into a PCMCIA slot 204 in the credit card authorization terminal 200 by the user. The general use of PCMCIA expansion slots 204 and associated cards 202 is well known in the art. Such a design would allow each of the credit card authorization terminals 200 to be identical, while the customized data relating to the graphical logo information for the retail establishment could be separately programmed onto an appropriate PCMCIA card 202 and supplied to the retailer. Integration of such a PCMCIA card 202 with the credit card authorization terminal 200 simply entails inserting the card into the designated slot 204. So configured, the credit card authorization terminal 200 of the second embodiment of the present invention may be programmed to execute the second preferred method of the present invention as illustrated in FIG. 10.

Figure 10:
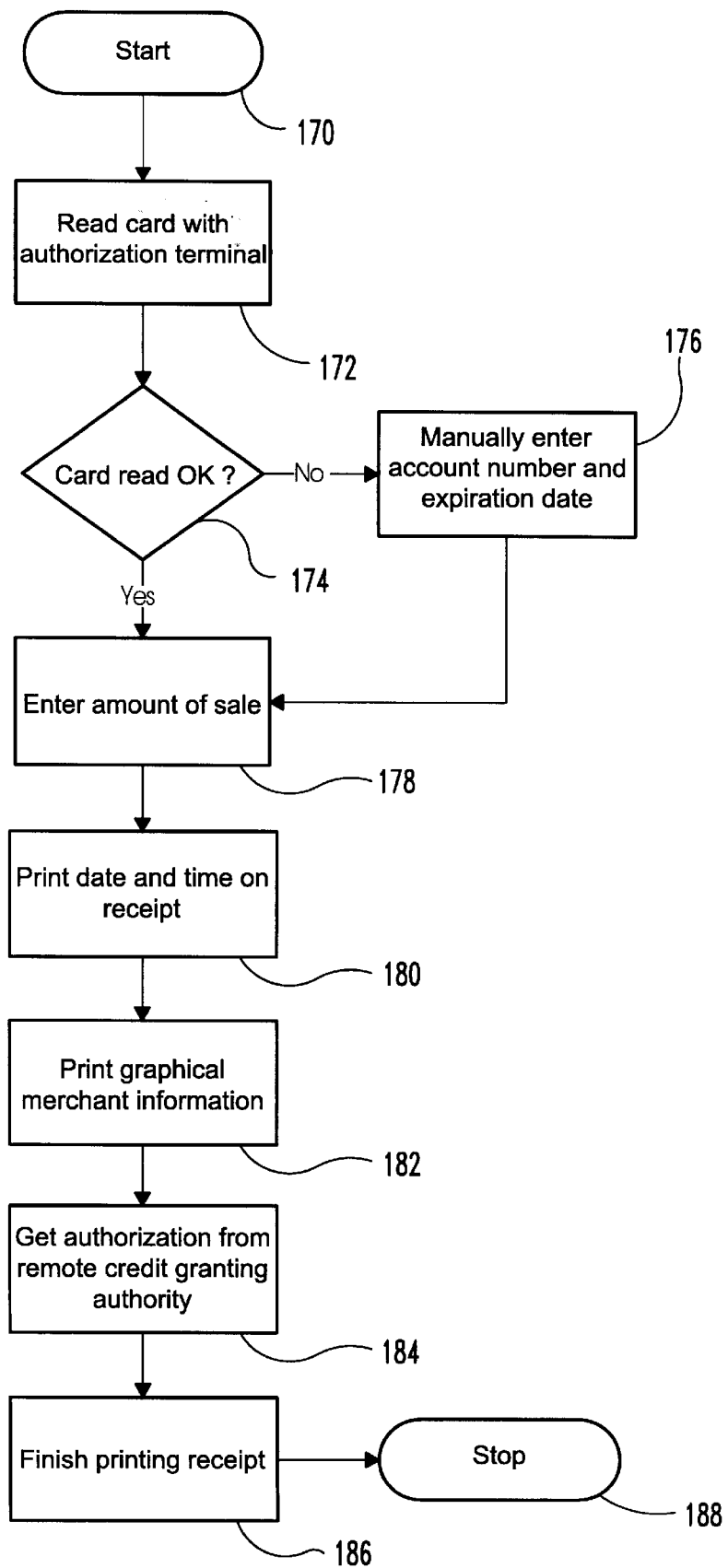
FIG. 10 is a schematic flow chart of a second embodiment method of the present invention.

The method of FIG. 10 begins at step 170 and continues to step 172 where the authorization terminal 200 is used to read the pertinent information from the consumer's credit card, such as by sliding the magnetic strip of the credit card through the slot 206 provided in the authorization terminal 200 for this purpose. Step 174 then determines whether valid information was obtained from the attempt to read the card in step 172. If valid card information was not obtained, the merchant is prompted by the authorization terminal 200 to manually input the consumer's account number and the expiration date of the credit card at step 176. Once the authorization terminal has received the valid credit card information, the process continues at step 178 where the amount of the credit transaction sale is entered into the authorization terminal. At step 180 the date and time of the transaction are printed by the authorization terminal on the receipt printer 12. At step 182, the merchant's graphical logo and the name of the retail establishment are printed on to the receipt. In the preferred embodiment, the data required to print this graphical information is obtained from the attached PCMCIA card 202. Authorization for the credit card transaction is obtained from the remote credit granting authority at step 184, and step 186 finishes printing the remainder of the credit transaction receipt. The method terminates at step 188.

It will be appreciated by those skilled in the art that the second embodiment method of the present invention, as illustrated in FIG. 10, allows the credit card authorization terminal 200 to access preprogrammed data which will allow the credit card authorization terminal 200 to print the merchant's graphical logo and name information on to the credit card receipt. Because the credit card authorization terminal 200 in the second embodiment apparatus of the present invention is designed to access and print this graphical information, there is no need for the interface 52 between the authorization terminal 200 and the receipt printer 12, as in the first embodiment of the present invention. Furthermore, each of the credit card authorization terminals 200 of the second embodiment apparatus of the present invention may be designed to be identical to one another, the particular merchant graphical data being stored on preprogrammed PCMCIA cards 202 which may be replaced by the merchant if he desires to change his logo or the name of his retail establishment.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. By way of example, the phrase "credit card" as used herein is intended to be synonymous with the phrase "debit card". Also, phrases such as "data representative of a graphical logo" and "graphical command and/or data words", etc. are intended to represent electrical signals which, when applied to the receipt printer 12, cause a predetermined graphical image to be printed.

What is claimed is:

1. An electronic funds transfer authorization system, comprising:

an electronic funds transfer authorization terminal operable to obtain authorization for an electronic funds transfer transaction and to generate a textual data string operable to cause a printing device to print a textual electronic funds transfer receipt;

an interface circuit coupled to the electronic funds transfer authorization terminal for reception of the textual data string, wherein the interface circuit is operable to search the textual data string for a predetermined search data string and to modify the textual data string by inserting a predetermined graphical data string into the textual data string when the search data string is located thereby creating a modified data string operable to cause a printing device to print a textual and graphical electronic funds transfer receipt; and an electronic funds transfer receipt printer coupled to the interface circuit for reception of the modified data string, wherein the modified data string is used to control a single print head within the receipt printer to print both textual and graphical symbols on the electronic funds transfer receipt.

2. The electronic funds transfer authorization system of claim 1, wherein:

the search data string comprises a name of a retail establishment; and the graphical data string comprises data representative of a graphical logo of the retail establishment.

3. The electronic funds transfer authorization system of claim 1, wherein the search data string is deleted from the modified data string.

4. The electronic funds transfer authorization system of claim 1, wherein the interface circuit comprises a microcontroller.

5. A method of providing a printer interface for an electronic funds transfer authorization terminal, comprising the steps of:

(a) receiving a textual data string from the authorization terminal, wherein the textual data string is operable to cause a printing device to print a textual electronic funds transfer receipt;

(b) searching the textual data string for a predetermined search data string;

(c) modifying the textual data string by inserting a predetermined graphical data string into the textual data string when the search data string is located thereby creating a modified data string operable to cause a printing device to print a textual and graphical electronic funds transfer receipt; and (d) transmitting the modified data string to an electronic funds transfer receipt printer, wherein the modified data string is used to control a single print head within the receipt printer to print both textual and graphical symbols on the electronic funds transfer receipt.

6. The method of claim 5, wherein:

the search data string comprises a name of a retail establishment; and the graphical data string comprises data representative of a graphical logo of the retail establishment.

7. The method of claim 5, wherein step (c) comprises:

(c.1) deleting the search data string from the modified data string; and (c.2) inserting the graphical data string into the modified data string when the search data string is located.

8. The method of claim 7, wherein the graphical data string is inserted into the modified data string at a location previously occupied by the search data string.

* * * * *

UNITED STATES PATENT AND TRADEMARK OFFICE
CERTIFICATE OF CORRECTION

PATENT NO : 5,850,217
DATED : December 15, 1998
INVENTOR(S) : Steven D. Cole

It is certified that error appears in the above-identified patent and that said Letters Patent is hereby corrected as shown below:

In column 9, line 55, please change "property" to --properly--.

Signed and Sealed this

Twenty-fourth Day of August, 1999

*Attest:*

Q. TODD DICKINSON

*Attesting Officer*   *Acting Commissioner of Patents and Trademarks*